(12) United States Patent
Wigboldy et al.

(10) Patent No.: US 12,146,517 B2
(45) Date of Patent: Nov. 19, 2024

(54) SELF-SEALING FASTENER

(71) Applicant: Altenloh, Brinck & Co. US, Inc., Bryan, OH (US)

(72) Inventors: Jason R. Wigboldy, Grand Rapids, MI (US); Mitchell B. Mahler, Grand Rapids, MI (US)

(73) Assignee: Altenloh, Brinck & Co. US, Inc., Bryan, OH (US)

( * ) Notice: Subject to any disclaimer, the term of this patent is extended or adjusted under 35 U.S.C. 154(b) by 615 days.

(21) Appl. No.: 17/246,047

(22) Filed: Apr. 30, 2021

(65) Prior Publication Data

US 2021/0341008 A1 Nov. 4, 2021

Related U.S. Application Data

(60) Provisional application No. 63/023,341, filed on May 12, 2020, provisional application No. 63/018,173, filed on Apr. 30, 2020.

(51) Int. Cl.
| | |
|---|---|
| *F16B 3/00* | (2006.01) |
| *F16B 15/00* | (2006.01) |
| *F16B 15/08* | (2006.01) |
| *F16B 33/00* | (2006.01) |

(52) U.S. Cl.
CPC .................................. *F16B 33/004* (2013.01)

(58) Field of Classification Search
CPC .. F16B 33/004; F16B 15/0092; F16B 43/001; F16B 33/06; F16B 33/008
USPC ................................ 411/82.3, 439, 440, 473
See application file for complete search history.

(56) References Cited

U.S. PATENT DOCUMENTS

| | | | | |
|---|---|---|---|---|
| 1,801,077 A | | 1/1929 | Gentry | |
| 1,897,335 A | * | 2/1933 | Riedel | E04D 3/3606 411/922 |
| 2,724,303 A | * | 11/1955 | Holcomb | F16B 15/0092 52/553 |
| 2,875,664 A | * | 3/1959 | Crooks | F16B 15/08 227/51 |
| 3,469,490 A | * | 9/1969 | Pearce, Jr. | F16B 43/001 411/965 |
| 3,639,137 A | * | 2/1972 | Marinelli | B21J 15/02 411/548 |
| 3,853,606 A | * | 12/1974 | Parkinson | C09D 123/08 524/517 |

(Continued)

OTHER PUBLICATIONS

Webpages from https://www.ndindustries.com/products/inert-sealing/nd-plastisol/, accessed Apr. 16, 2020.

*Primary Examiner* — William D Hutton, Jr.
*Assistant Examiner* — Carl J Carlson
(74) *Attorney, Agent, or Firm* — Gardner, Linn, Burkhart & Ondersma LLP (57) ABSTRACT

A self-sealing fastener for securing a building component to a framing member, such as securing a sheathing layer over which is disposed a barrier layer to a framing member, includes a fastener with a shank and a head, and a rubberized coating surrounding at least a portion of the shank of the fastener. The rubberized coating is designed to peel back from the shank and accumulate at least around the shank and/or head upon insertion into the wall assembly, thereby sealing off an entry of the self-sealing fastener into the barrier layer and sheathing layer.

7 Claims, 9 Drawing Sheets

(56) References Cited

U.S. PATENT DOCUMENTS

| | | | | |
|---|---|---|---|---|
| 4,875,818 A * | 10/1989 | Reinwall | ............... | F16B 33/004 |
| | | | | 411/371.1 |
| 4,932,480 A * | 6/1990 | Golsch | .................... | B25C 1/047 |
| | | | | 173/210 |
| 4,964,774 A * | 10/1990 | Lat | ...................... | C23C 28/3225 |
| | | | | 411/446 |
| 5,056,976 A * | 10/1991 | Sygnator | ................ | F16B 15/08 |
| | | | | 411/442 |
| 5,178,903 A * | 1/1993 | Lat | ...................... | F16B 15/0092 |
| | | | | 427/446 |
| 5,260,100 A * | 11/1993 | Day | .................... | F16B 25/0031 |
| | | | | 427/388.1 |
| 8,920,088 B1 * | 12/2014 | Garvin | ............... | F16B 15/0092 |
| | | | | 411/443 |
| 10,371,189 B2 * | 8/2019 | Ryan | ...................... | F16B 15/06 |
| 11,098,747 B2 * | 8/2021 | Zimmerman | ........... | F16B 35/06 |
| 2004/0265092 A1 * | 12/2004 | Lat | ......................... | B05D 7/14 |
| | | | | 411/443 |

* cited by examiner

SELF-SEALING FASTENER

CROSS REFERENCE TO RELATED APPLICATION

The present application claims priority of U.S. provisional applications Ser. No. 63/018,173 filed on Apr. 30, 2020 and Ser. No. 63/023,341 filed on May 12, 2020, which are both hereby incorporated herein by reference in their entireties.

FIELD OF THE INVENTION

The present invention is directed to wall system fasteners, and in particular, toward energy efficient fasteners with seals that may be used for various applications, including sealed securing of structural sheathing, insulation, or cladding attachments.

BACKGROUND OF THE INVENTION

Threaded and non-threaded fasteners are used in building construction of wall systems, including for use in securing of sheathing, different types of insulations or barrier layers, and various cladding attachments. Residential and commercial construction has seen an emerging trend of applying a barrier layer, such as a weather resistive barrier (WRB), an air barrier, or a vapor barrier, to an exterior surface of a structural sheathing, such as gypsum, oriented strand board (OSB), or plywood to form a sheathing with an integrated barrier layer, which may be referred to as an integrated sheathing. Fasteners are typically required to secure not only the integrated sheathing to a framing member, such as a stud, but also various cladding components, such as a rigid foam insulation and/or vinyl siding, over the integrated sheathing and into the framing members. Fasteners used to penetrate through the integrated sheathing naturally create openings in the barrier layer and structural sheathing that often become "weak points" allowing moisture and/or air to penetrate through the building envelop thereby potentially causing energy loss, leaks, and/or other undesirable damage for the building structure.

SUMMARY OF THE INVENTION

Embodiments of the present invention provide a self-sealing fastener for attaching a sheathing with integrated barrier layer, and optionally a cladding attachment, to a structural framing member such that the penetration of the fastener is sealed off to inhibit air, moisture, and/or vapor from infiltrating through the integrated barrier layer and sheathing past the fastener. The self-sealing fastener includes a seal that forms into a barrier seal upon the fastener penetrating into the sheathing and barrier layer such that moisture or air leakage between the fastener and the barrier layer is inhibited, such as by being reduced or eliminated, thereby reducing damage and energy transfer through the integrated sheathing positioned between the framing member and the cladding attachment.

In one form of the present invention, a self-sealing fastener for securing building materials to a structural member, such as sheathing and an integrated barrier layer to a structural framing member, includes a fastener with a shank and a head, and a rubberized coating surrounding at least a portion of the shank of the fastener. The rubberized coating is peelable so as to be configured to peel off the shank and accumulate at least around the shank and/or head, thereby sealing off the entry of the self-sealing fastener into the sheathing and barrier layer, with the fasteners being nails or threaded fasteners. Self-sealing fasteners in accordance with the present invention may also be used for securing insulation and/or a cladding system to sheathing and structural members.

According to one aspect, the rubberized coating is configured to peel off the shank and compress or accumulate at an underside and around the head of the fastener.

According to another aspect, the rubberized coating is configured to peel off the shank only upon penetrating a generally rigid material, such as sheathing covered by a barrier layer, and not peel off the shank upon penetrating a less dense material, such as an insulation layer constructed of rigid foam, fiber or a batt material.

Multiple self-sealing fasteners may be collated together for use by a fastener gun. According to yet another aspect, the rubberized coating may be used to collate a plurality of fasteners together to form a collated fastener assembly.

In another form of the present invention, a self-sealing fastener for securing building materials to a structural member includes a fastener with a shank and a head, and a pre-assembled gasket surrounding at least a portion of the shank proximal to the head. The gasket is configured to compress at an underside of the head and around the portion of the shank thereby sealing off an entry of the self-sealing fastener into the building materials.

In another form of the present invention, a self-sealing fastener for securing building materials to a structural member includes a fastener with a shank and a head. The head includes an upper side and an underside. The underside radially slopes from the shank and towards the upper side such that the underside thins out as it radially extends from the shank and towards an outer perimeter of the head. The head is configured to inwardly bend or concave in response to said fastener being overdriven into the sheathing and barrier layer.

Still further, a fastener gun assembly in accordance with another aspect of the invention is used to apply collated fasteners to a wall system for securing of building materials, with the fastener gun assembly including an integrated sealant tape dispenser. The dispenser is operable to apply sealant tape to the wall system where the fasteners are applied to provide a seal against vapor and/or moisture. The sealant tape may be applied over top of the fasteners after they have been secured to the wall system, or may be provided prior to the insertion of the fasteners into the wall system, with the sealant tape thus providing a seal against or with the fastener. Fasteners with or without a rubberized coating may be employed.

Thus, the integrated sheathing and cladding attachments of a commercial or residential building may be secured to the structural framing members of the building by the self-sealing fasteners in a manner that improves thermal insulation of the walls of the building and reduces damage to the structure of the building due to a potential leakage between the fastener and the integrated sheathing.

These and other objects, advantages, purposes and features of the present invention will become apparent upon review of the following specification in conjunction with the drawings.

DESCRIPTION OF THE PREFERRED EMBODIMENTS

Figure 1:
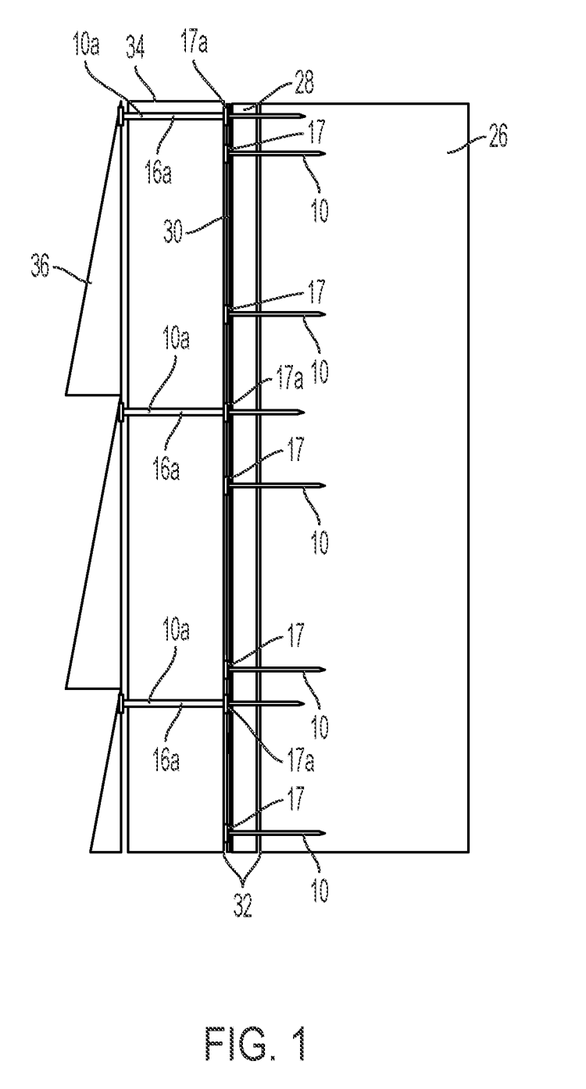
FIG. 1 is a side cross sectional view of a wall system with self-sealing fasteners in accordance with the present invention used to secure building materials.
Figure 2A:
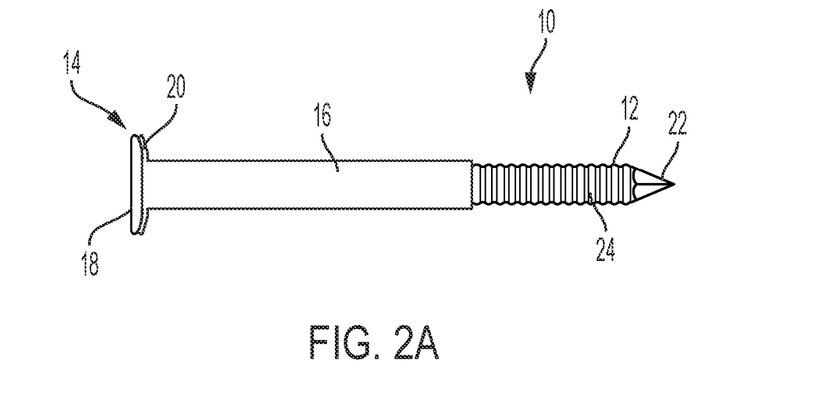
FIG. 2A is a side elevation view of a self-sealing fastener of FIG. 1, shown with a rubberized coating disposed thereon.

Referring now to the drawings and the illustrated embodiments depicted therein, and initial reference to the exemplary embodiment of FIG. 2A, a self-sealing fastener 10 includes a shank 12, a head 14 disposed at one end of the shank 12 and being generally perpendicular to the longitudinal extent of the shank 12, and a rubberized coating 16 applied to, covering, and surrounding at least a portion of the shank 12. Fastener 10 is disclosed in FIG. 1 as affixing sheathing layer 28 with integrated barrier layer 30 to structural member 26. Coating 16 is peelable so as to peel back upon insertion of fastener 10 into the wall system, and in particular as being passed through barrier layer 30 and sheathing layer 28. As such, coating 16 provides a seal 17 between and at the interface of the body of fastener 10 and the sheathing layer 28 so as to inhibit leakage past the fastener 10 at the penetration through the barrier layer 30, to thereby provide a barrier to moisture and air penetration through the building envelope. Fasteners in accordance with the present invention may be provided in various configurations, including nails and threaded fasteners, and in varying lengths and with various configurations of rubberized coating. For example, as also shown in FIG. 2A, fasteners 10a are provided that are used in assembling a cladding system configured as vinyl siding 36 over an insulation layer 34 to the wall system, where fasteners 10a are longer than fasteners 10. As understood from FIG. 2A, fasteners 10a are likewise provided with a rubberized coating 16a that peels back upon passing through the sheathing 28 and integrated barrier layer 30 to form a seal 17a.

Figure 11:
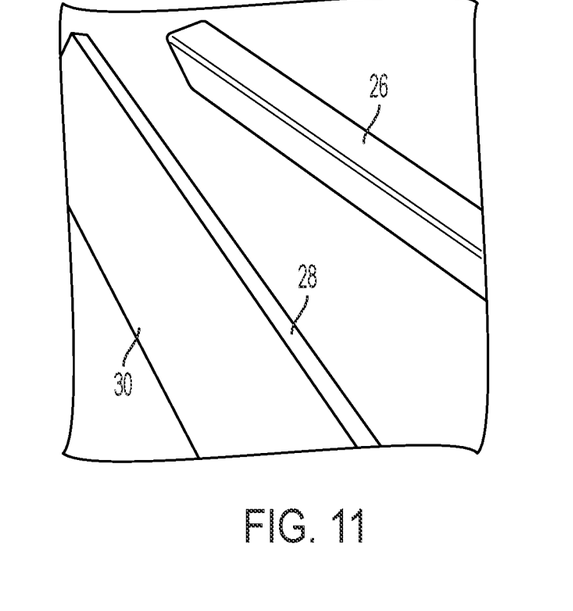
FIG. 11 is a perspective view of components used in the formation of a wall system in accordance with the present invention.

As noted, in the illustrated embodiment of FIG. 1, a portion of the wall of a building is shown in which fasteners 10 and 10a having different length shanks 12 are used for securing building materials for construction of the wall system. The illustrated portion of the wall includes an internal structural member 26, such as a wood or steel stud, a structural sheathing 28, which may be formed of gypsum, OSB, or plywood, a barrier layer 30, such as a WRB, air, or vapor barrier, which may be pre-applied or pre-assembled with the structural sheathing 28 to form an integrated sheathing 32, a cladding component 34, such as a rigid foam insulation panel, and a cladding 36, such as for example vinyl siding. In the illustrated embodiment of FIG. 11, for example, the internal structural member 26 is a wood stud, the structural sheathing 28 is formed of plywood, and the barrier layer 30 is pre-assembled with the structural sheathing 28. The barrier layer 30 may be a membrane or sheeting layer that is disposed over the sheathing 28, or alternatively may be a pre-applied barrier layer that is applied during the process of producing the sheathing. As best shown in FIG. 1, a shorter version of the fastener 10 can be used to secure the sheathing 28 and integrated barrier layer 30 to the structural member 26, and a longer version of the fastener 10a can be used to secure cladding 36 and insulation layer 34 over the sheathing 32 and barrier layer 30 to the structural member 26.

Figure 2B:
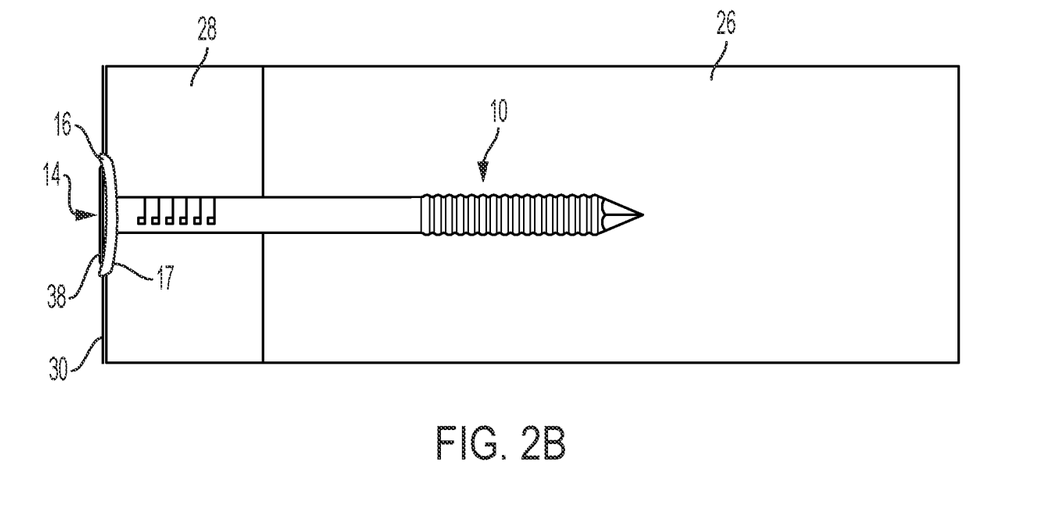
FIG. 2B is a side elevation view of the self-sealing fastener of FIG. 2A shown driven into a portion of a wall system with the rubberized coating peeled back.

With reference to FIGS. 1 and 2B, fastener 10 comprises a body having shank 12 and a head 14 that includes an upper surface 18 and a lower surface 20. The rubberized coating 16 is applied over at least a portion of the body. Optionally, the rubberized coating 16 may be applied to and cover at least a portion of the lower surface 20 of the head 14. The shank 12 may include a pointed tip 22 at the other end of the shank 12 to promote insertion of the fastener 10 into an object, and one or more ribs 24 to increase retention of the fastener 10 in the stud 26 when inserted. It is also contemplated that the shank 12 of fastener 10 may be of various lengths to form shorter 10 and longer 10a versions of the fastener, such as for fastening different types of attachments, which may additionally include varying thicknesses. In the illustrated embodiment, the shorter version of fastener 10 is used to fasten the sheathing 28 and barrier layer 30 to the structural member 26, the rubberized coating 16 surrounding shank 12 peels off the shank 12 and collects or compresses at, beneath, and/or around the head 14 of the fastener 10, thereby forming a gasket or a barrier seal 38 at the surface of the barrier layer 30 that seals off or blocks any gap between at least the head 14, and/or a region of the shank 12 proximal to the head 14, and the barrier layer 30 and sheathing 28. Whenever a longer version of fastener 10a is used to fasten cladding component 34 and cladding 36 over the barrier layer 30 and sheathing 28 to the structural member 26, however, the rubberized coating 16 remains intact and on the shank 12 while the shank 12 is driven through the nailing-flange holes (not shown) in the cladding 36 and through the less dense and relatively softer insulation layer 34, peeling off the shank 12 only as the shank 12 is driven into the barrier layer 30 and sheathing 28, due to as understood the rigid, dense material of the sheathing 28 supporting the barrier layer 30 (FIG. 1). The mechanism of forming the barrier seal 38 at the surface of the barrier layer 30 for fastener 10a is similar to the one described above for the shorter version of the fastener 10. It should be appreciated that in order to form the barrier seal 38 at the surface of the barrier layer 30, the shorter version of fastener 10 should include rubberized coating 16 covering at least a portion of the shank 12 proximal to the head 14, while the longer version of fastener 10 should include rubberized coating 16 covering at least a portion of the shank 12 proximal to the tip 22 of fastener 10. It should also be understood that the entire length of the shank 12, for both short and long versions of the fastener 10, 10a may be covered/surrounded by the rubberized coating 16.

As noted above, the rubberized coating 16 is constructed so as to remain intact and on the shank 12 while the fastener 10 is driven through the nailing-flange holes, due to the nailing-flange holes being sized to allow the fastener to pass there through. As also noted, the coating is additionally constructed so as not to peel off when passing through the less insulation layer 34, but does peel away from the shank upon penetrating the more rigid sheathing layer 28. It is thus understood by a person of skill that the peelable nature of coating means the coating 16 is able to remain in place when passing through a less rigid cladding component, such as rigid foam insulation known in the building construction field, but peels back to mushroom and form a gasket or seal on the barrier layer 30 when penetrating the sheathing layer 28, such as a sheathing layer constructed of gypsum or wood, including OSB, plywood, particle board or otherwise. In the illustrated embodiment the rubberized coating comprises a thick liquid prior to being applied to a fastener, but then dries so as to be sufficiently rigid to remain in place on the fastener as described, including to enable the coated fastener to be used with a fastener gun. The coating may be a urethane, latex, silicone, or siliconized rubber, for example. In one embodiment the coating comprises FLEX SEAL brand liquid rubber sealant coating.

Figure 3A:
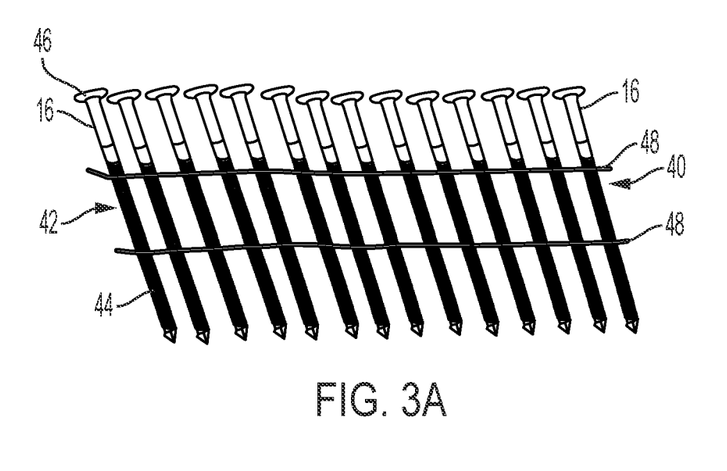
FIG. 3A is a perspective view of a wire-collated embodiment of self-sealing fasteners in accordance with the present invention with the fasteners configured as ring shank nails.
Figure 3B:
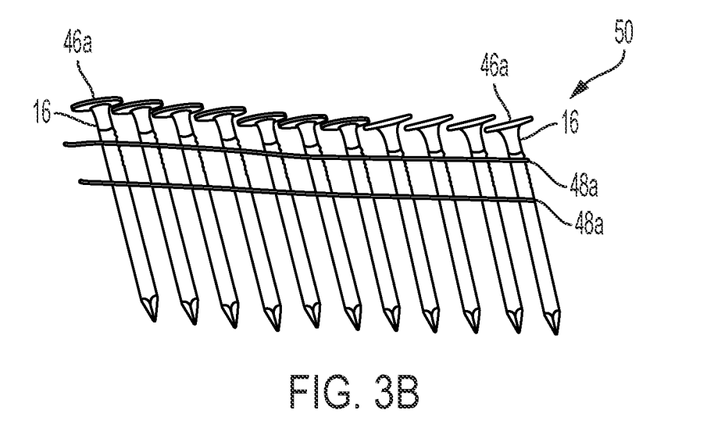
FIG. 3B is a perspective view of another wire-collated embodiment of self-sealing fasteners in accordance with the present invention with the fasteners configured as large head diameter roofing nails.

In the embodiment of FIG. 3A, the self-sealing fasteners are configured as a set of wire-collated ring shank fasteners or nails 40 for use with a pneumatic nail gun. The set 40 includes a plurality of nails 42, with each nail 42 being interconnected with an adjacent nail of the set by wires 48. Each nail 42 includes the rubberized coating 16 covering/surrounding at least a portion of a shank 44 of the nail 42 that is proximal to a head 46 of the nail 42. In the illustrated embodiment, the head 46 is also covered by the rubberized coating 16. The mechanism of sealing off any gap between at least the head 46, and/or a region of the shank 44 proximal to the head 46, and the integrated sheathing 32 (FIG. 1) is similar to the mechanism of the previous embodiment, except that each nail 42 is driven one by one into the integrated sheathing 32 by a pneumatic nail gun. In yet another alternative embodiment of FIG. 3B, the self-sealing fasteners are configured as a set of wire-collated 48a large head diameter roofing fasteners or nails 50 for use with a pneumatic nail gun. The rubberized coating 16 is applied to the large head 46a diameter roofing nails 50 in a similar manner and to perform a similar function as described above, i.e. to peel off upon insertion of the nails into a rigid surface that, for example, forms part of the roof and seal off any gap between the heads of the nails, and/or a region of the shanks of the nails proximal to the heads, and the rigid surface. For example, as being driven through roofing paper or shingles into the roofing underlayment.

Figure 4:
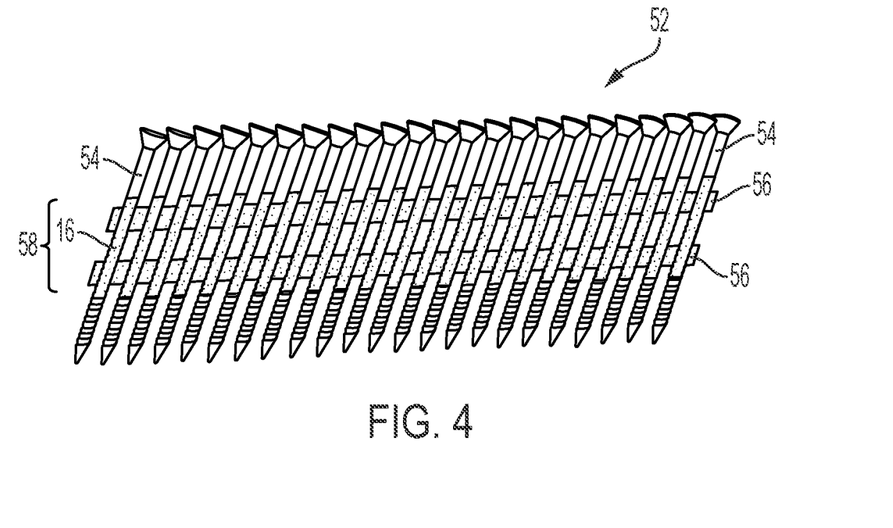
FIG. 4 is a perspective view of a further collated embodiment of self-sealing fasteners in accordance with the present invention with the fasteners configured as threaded fasteners.

In another embodiment, as illustrated in FIG. 4, the self-sealing fasteners are configured as a set of collated pneumatically driven threaded fasteners 52. The set 52 includes a plurality of fasteners 54, each of which is interconnected/collated with an adjacent fastener of the set with the rubberized coating 16. Accordingly, the rubberized coating 16 may be used as a collation material to bind the fasteners 54 together, which collation material breaks apart whenever each fastener 54 is driven one by one into the integrated sheathing 32 by a pneumatic or electric gun, such as a drill or the like. In the illustrated embodiment, a pair of links 56 of the rubberized coating 16 binds the fasteners 54 together, with the rubberized coating 16 also covering a region 58 of a shank of each fastener 54 between the links 56. As described above, whenever each fastener 54 is driven into the barrier layer 30 and sheathing 28, the rubberized coating 16 peels off the shank of each fastener 54 and compresses beneath and/or around the head of the fastener effectively sealing the penetration area of the fastener. Alternatively and/or additionally, the links 56 may include or be formed in part by a physical connection, such as plastic, cardboard, paper or the like.

Figure 5A:
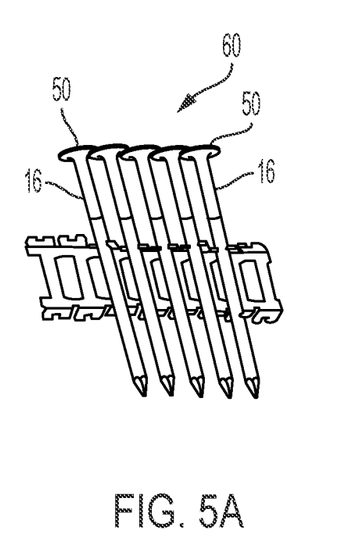
FIGS. 5A and 5B are perspective views of plastic retainer-collated embodiments of self-sealing fasteners in accordance with the present invention with the fasteners configures as large head diameter roofing nails and disclosing alternative applications of rubberized coating.
Figure 5B:
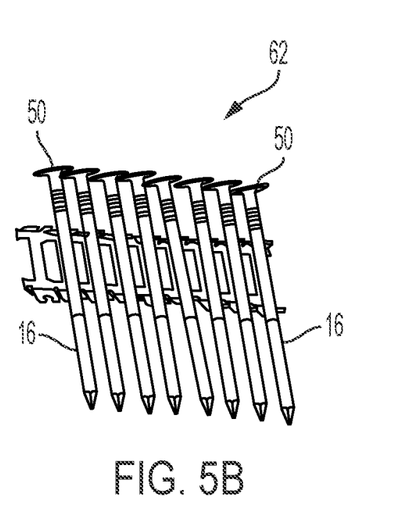

In the embodiment of FIGS. 5A and 5B, alternative self-sealing fasteners are shown that are configured as sets of plastic strip or plastic retainer-collated nails 60 and 62. The set 60 includes a plurality of large head diameter roofing nails 50, each of which includes the rubberized coating 16 applied over the heads of the nails and shank portions of the nails proximal to the heads. The set 62 includes a plurality of large head diameter roofing nails 50, each of which includes the rubberized coating 16 applied over the tip portions of the nails, i.e. distal portions of the nails from the nails' heads. As described above, whenever nails of the sets 60 and 62 are driven into a rigid surface that, for example, forms part of the roof, the rubberized coating 16 peels off the shanks of each nail and compresses beneath and/or around the head of the nail effectively sealing the penetration area of the nail.

Figure 6:
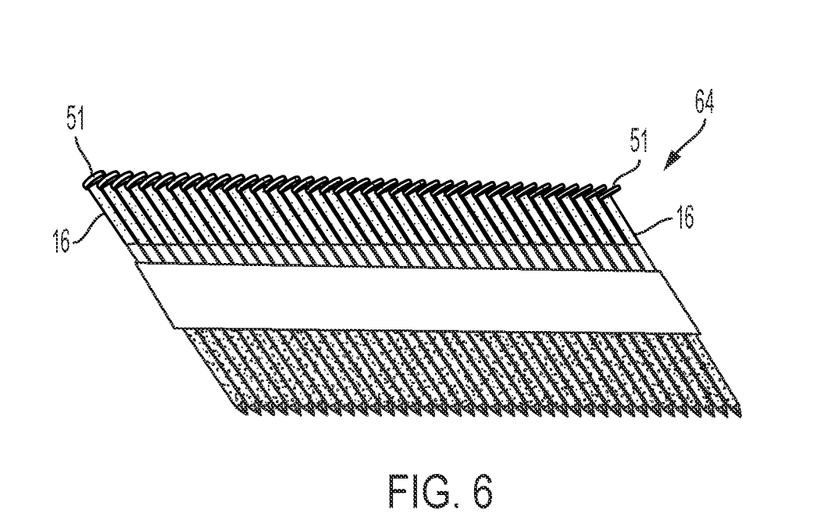
FIG. 6 is a perspective view of a paper-collated embodiment of self-sealing fasteners in accordance with the present invention with the fasteners configured as clipped head nails.
Figure 7:
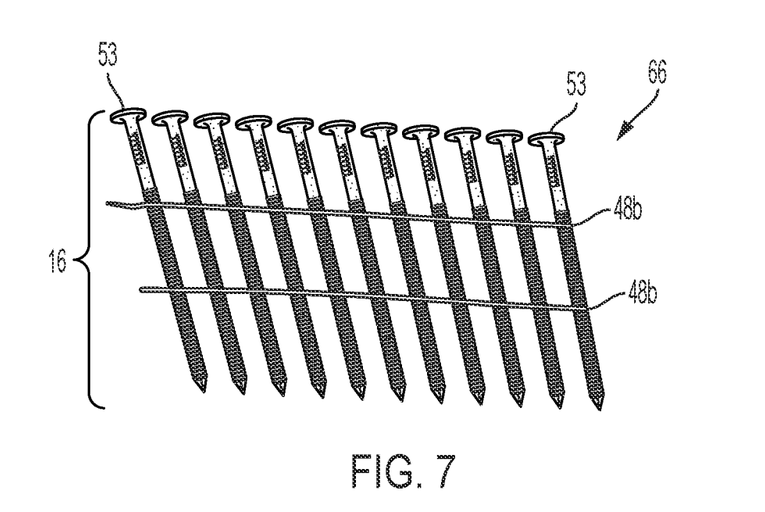
FIG. 7 is a perspective view of a wire-collated embodiment of self-sealing fasteners in accordance with the present invention with the fasteners configured as ring shank nails and disclosing the entire assembly coated with the rubberized coating.

In another embodiment, as illustrated in FIG. 6, the self-sealing fasteners are configured as a set of pneumatically driven paper-collated nails 64. The set 64 includes a plurality of clipped head nails 51, each of which includes the rubberized coating 16 applied over the heads of the nails and shank portions of the nails proximal to the heads. As described above, whenever nails 51 of the set 64 are driven into a rigid surface, the rubberized coating 16 peels off the shanks of each nail and compresses beneath and/or around the head of the nail effectively sealing the penetration area of the nail. In yet another embodiment, as illustrated in FIG. 7, the self-sealing fasteners are configured as a set of pneumatically driven wire-collated nails 66. The set 66 includes a plurality of nails 53 and a pair of parallel wires 48b interconnecting the nails to form a collated assembly. In the illustrated embodiment, the entire collated assembly is coated or covered with the rubberized coating 16. As described above, whenever nails of the set 66 are driven into a rigid surface, the rubberized coating 16 peels off the shanks of each nail and compresses beneath and/or around the head of the nail effectively sealing the penetration area of the nail.

Figure 8:
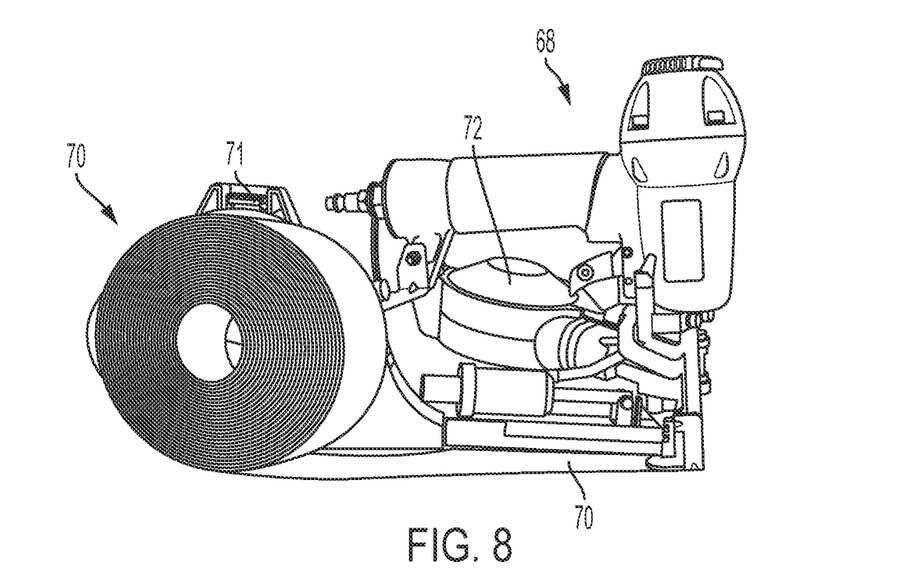
FIG. 8 is a perspective view of a pneumatic fastener gun assembly with an integrated dispenser for rolled sealant tape in accordance with yet another aspect of the present invention.

According to yet a further aspect of the present invention, as illustrated in FIG. 8, a pneumatic fastener gun or gun assembly 68 is disclosed that includes a dispenser 71 for sealant tape 70, as well as a fastener chamber 72 for retention of fasteners. Fastener gun 68 via dispenser 71 is adapted to dispense a section of sealant tape 70 with each fastener dispensed by the fastener gun 68. In particular, fastener gun 68 is used to apply collated fasteners from chamber 72 to a wall system for securing of building materials, with the fastener gun 68 integrally including sealant tape dispenser 71. The dispenser 71 is operable to apply sealant tape 70 to the wall system where the fasteners are applied to provide a seal against vapor and/or moisture. The sealant tape 70 may be applied over top of the fasteners after they have been secured to the wall system, or may be provided prior to the insertion of the fasteners into the wall system, with the sealant tape thus providing a seal against or with the fastener. Conventional fasteners and/or self-sealing fasteners with a rubberized coating such as disclosed herein may be employed. The dispenser 71 is adapted to cooperate with the fastener gun 68 and index with each fastener dispensed into a surface by the fastener gun 68, such as via the pneumatic air supply to gun 68 or via an electrical or battery power supply to such a fastener gun. Tape 70 may be either pre-applied prior to a fastener or fasteners being driven there through and into the building structure, or may be post-applied over the head of a fastener after a fastener or fasteners have been driven by the fastener gun into the building structure. In either scenario, the tape 70 may include a sealant material and/or an adhesive thereon to seal against either the underside of a fastener head or seal over the fastener head.

Figure 9:
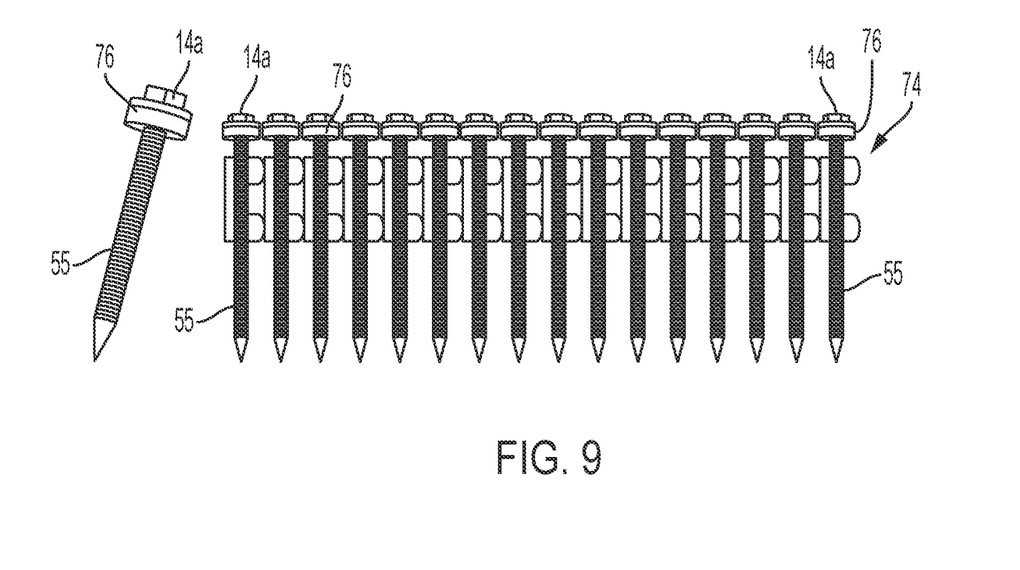
FIG. 9 is a perspective view of a plastic retainer-collated self-sealing fasteners in accordance with another embodiment of the present invention with the fasteners configured as threaded fasteners with sealing gaskets.

FIG. 9 discloses yet another alternative embodiment of a self-sealing fastener in accordance with another aspect of the present invention. As there shown, self-sealing threaded fasteners 55 configured as a set of plastic retainer-collated fasteners 74 are disclosed with each fastener 55 of the set 74 including a pre-assembled sealing gasket 76 disposed at the lower surface of the fastener head 14*a*. When a self-sealing fastener 55 of the set 74 is driven into a rigid surface, the gasket 76 compresses beneath and/or around the head and/or shank portion of the fastener, thereby effectively sealing the penetration area of the fastener. As shown, the fasteners 55 are collated together via a plastic connector or retainer, but other collation structures are possible.

Figure 10A:
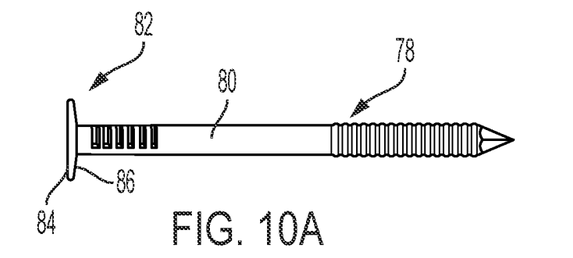
FIGS. 10A-D are side elevation views of a fastener with a self-sealing head in accordance with yet another embodiment of the present invention.
Figure 10B:
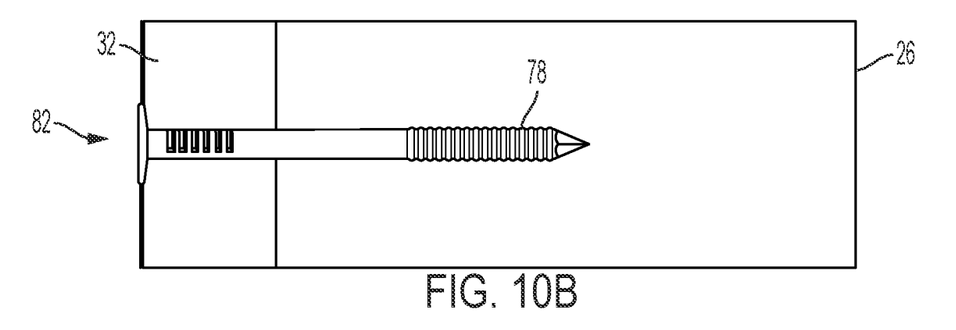
Figure 10C:
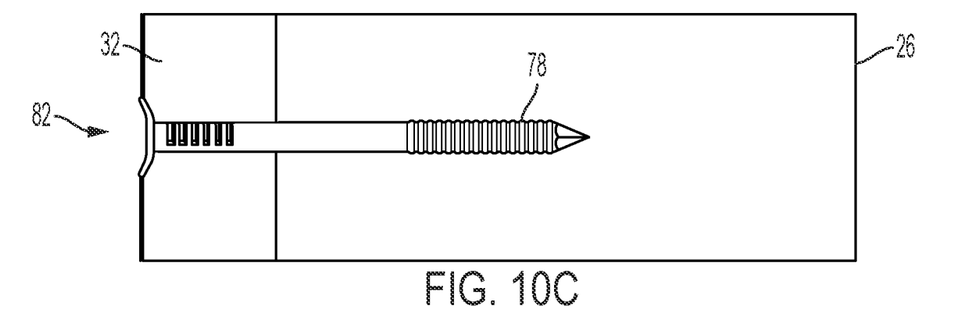
Figure 10D:
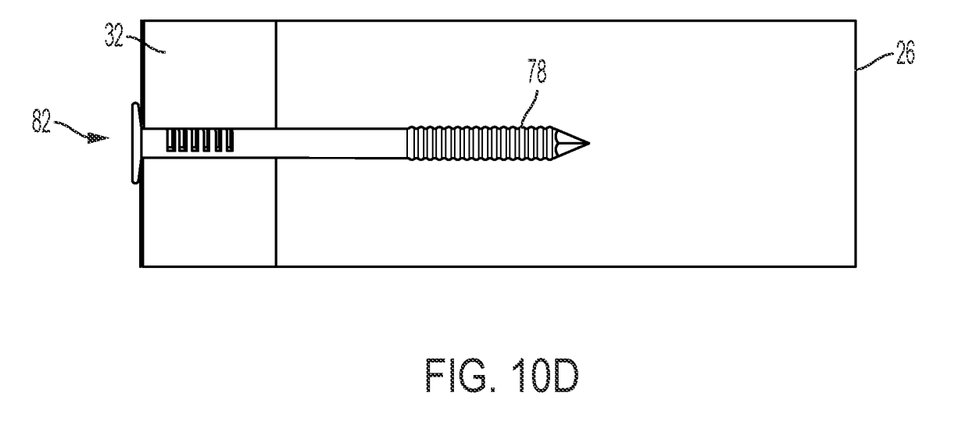

In accordance with yet another aspect of the present invention, as illustrated in FIGS. 10A-10D, an alternative self-sealing fastener 78 configured as a nail is shown. The fastener 78 includes a longitudinally extending shank 80 and a large diameter head 82 disposed at one end of and generally perpendicular to the shank 80. In the illustrated embodiment, the head 82 is circular and includes an upper surface 84 and a lower surface 86. The lower surface 86 radially slopes from the shank 80 towards the upper surface 84, such that the lower surface 86 thins out as it radially extends from the shank 80 and towards an outer perimeter of the head 82. The head 82 is configured such that whenever fastener 78 is ideally driven through the integrated sheathing 32 and into the structural member 26, the overall configuration of the head 82 remains unchanged (FIG. 10B). However, whenever fastener 78 is overdriven into the integrated sheathing 32 and the structural member 26, the outer perimeter of the large diameter head 82 bends inwardly or concaves forming a "reverse umbrella" or "cupped" con-figuration, thereby preventing damage to the barrier layer 30 applied over the structural sheathing 28 (FIG. 10C). If fastener 78 is underdriven into the integrated sheathing 32 and the structural member 26, as shown in FIG. 10D, the sloping surface or convex shape of the lower surface 86 of the large diameter head 82 is still able to compress against the barrier layer 30 due to the rigid sheathing layer 28 ensuring an adequate seal between the head 82 of the fastener 78 and the barrier layer 30. Fastener 78 may additionally be provided with a rubberized coating. It should be appreciated that as referenced herein large diameter head is understood with respect to industry terminology for such fasteners.

Figure 12:
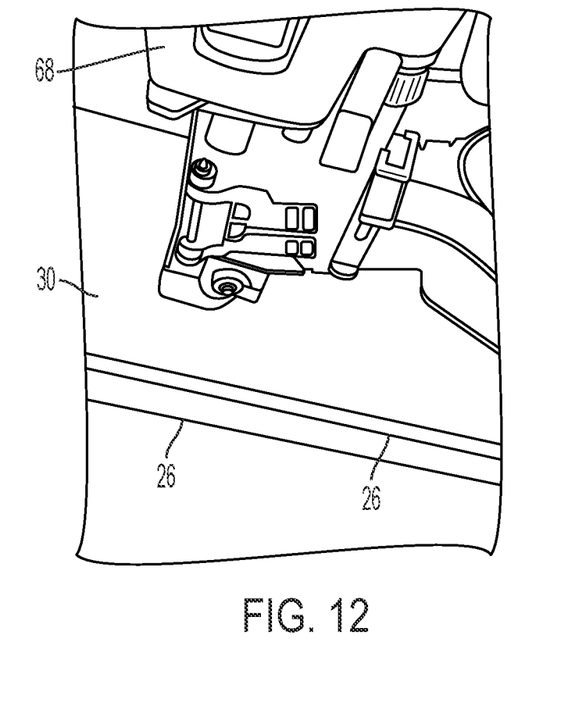
FIG. 12 is a perspective view of a pneumatic fastener gun assembly being used to secure the components of the wall system of FIG. 11.
Figure 13:
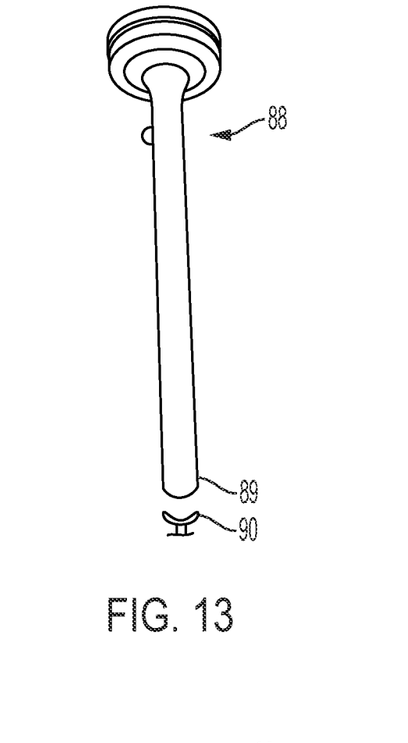
FIG. 13 a perspective view of an internal firing pin of the pneumatic fastener gun assembly of FIG. 12.

With reference to FIGS. 12 and 13, a fastener gun 68 having a specially configured internal firing pin 88 may be provided to impart a desired cupped or concave orientation to the head of a nail, such as for use in driving in a nail 78 as discussed above or a conventional nail having a larger diameter head. As understood from FIGS. 11 and 12, a sheathing layer 28 with an integrated barrier layer 30, together comprising an integrated sheathing member 32, is to be attached to wood stud 26 by way of a fastener configured as a nail. Firing pin 88 includes a bull nosed, or rounded or convex nail driving end 89 that, when impacting or driving a nail for attachment of sheathing 28 to stud 26, deforms the head of the nail around the end 89 of the firing pin 88 with the outer perimeter of the large diameter head being bent upwardly to form a "cupped" head 90, as illustrated in FIG. 13. The underside of the cupped head 90 has a generally hemispherical surface that aids in sealing at the barrier layer 30.

Figure 14:
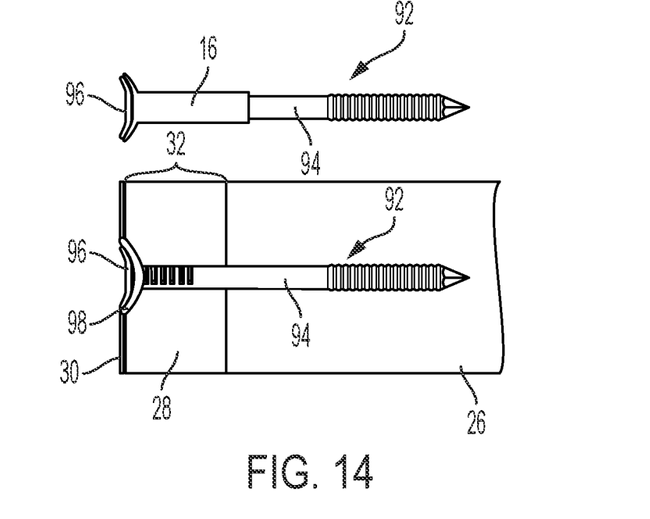
FIG. 14 are side elevation views of a fastener with a cupped and self-sealing head in accordance with yet another embodiment of the present invention.

Alternatively, in yet a further embodiment, the outer perimeter of a large diameter head of a fastener may be intentionally bent upwardly or "cupped" during production of the fastener. Such a fastener having a "pre-cupped" head would likewise be driven using the pneumatic gun 68 with convex end firing pin 88, with the pre-cupped or concave orientation of the head promoting the sealing at the barrier layer 30. As illustrated in FIG. 14, such an alternative self-sealing fastener 92 configured as a nail is shown. The self-sealing fastener 92 includes a shank 94, a large diameter head 96 disposed at one end of the shank 94 and being generally perpendicular to the longitudinal extent of the shank 94, and a rubberized coating 16 applied to, covering, and surrounding at least a portion of the shank 94. In the illustrated embodiment, an outer perimeter of the large diameter head 96 of fastener 92 is bent upwardly or "cupped" during production of fastener 92. Such a "pre-cupped" configuration of the head 96 of fastener 92 is designed to promote sealing via the generally hemispherical undersurface of the nail head that engages with the barrier layer 30. When fastener 92 is driven into the integrated sheathing 32, the rubberized coating 16 surrounding shank 94 peels off the shank 94 and collects or compresses at, beneath, and/or around the cupped head 96 of the fastener 92, thereby forming a gasket or a barrier seal 98 at the surface of the barrier layer 30. The barrier seal 98 promotes the sealing off or blocks any gap between at least the cupped head 96, and/or a region of the shank 94 proximal to the head 96, and the barrier layer 30 and sheathing layer 28.

Accordingly, the present invention provides various embodiments of self-sealing fasteners that prevent leakage into cavities of a structure and improve thermal insulation of the structure for which the self-sealing fasteners were used.

While the foregoing description describes several embodiments of the present invention, it will be understood by those skilled in the art that variations and modifications to these embodiments may be made without departing from the spirit and scope of the invention, as defined in the claims below. The present invention encompasses all combinations of various embodiments or aspects of the invention described herein. It is understood that any and all embodiments of the present invention may be taken in conjunction with any other embodiment to describe additional embodiments of the present invention. Furthermore, any elements of an embodiment may be combined with any and all other elements of any of the embodiments to describe additional embodiments. Changes and modifications in the specifically-described embodiments may be carried out without departing from the principles of the present invention, which is intended to be limited only by the scope of the appended claims as interpreted according to the principles of patent law including the doctrine of equivalents.

The embodiments of the invention in which an exclusive property or privilege is claimed are defined as follows:

1. A self-sealing fastener comprising:
   a shank and a head, said head comprising an upper side and an underside and a circular outer periphery, with said shank having a circular cross section and said head extending radially outwardly relative to said shank about the entire circumference of said shank;
   wherein said head has a thickness along the radial extension of said head relative to said shank with said thickness of said head at said shank being greater than said thickness of said head at the outer periphery of said head.

2. The self-sealing fastener of claim 1, further comprising a pealable coating disposed about the circumference of said shank along at least a portion of a length of said shank, wherein said peelable coating is configured to peel back from said shank when said self-sealing fastener is driven into a building component.

3. The self-sealing fastener of claim 2, wherein said pealable coating is further disposed at said underside of said head.

4. The self-sealing fastener of claim 2, wherein said pealable coating comprises a rubberized coating.

5. The self-sealing fastener of claim 1, wherein said fastener comprises a nail and wherein said underside of said head radially slopes from said shank towards said outer periphery such that said underside thins out as it radially extends from said shank towards said outer periphery of said head.

6. The self-sealing fastener of claim 5, wherein said upper side of said head is flat prior to installation, and wherein said upper side of said head is configured to upwardly bend or concave in response to said fastener being overdriven into a building component.

7. A plurality of self-sealing fasteners according to claim 2, and wherein said pealable coating is configured to collate said plurality of fasteners together to form an assembly of collated fasteners.

* * * * *